United States Patent [19]

Schatz

[11] Patent Number: 4,928,639
[45] Date of Patent: May 29, 1990

[54] MULTICYLINDER IC ENGINE WITH A STROKE CHARGING DEVICE

[76] Inventor: Oskar Schatz, Waldpromenade 16, 8035 Gauting, Fed. Rep. of Germany

[21] Appl. No.: 267,445

[22] Filed: Nov. 4, 1988

[30] Foreign Application Priority Data

Nov. 6, 1987 [DE] Fed. Rep. of Germany ....... 3737829

[51] Int. Cl.⁵ .............................................. F02M 35/10
[52] U.S. Cl. .............................. 123/52 MF; 123/65 B; 123/559.1
[58] Field of Search ......... 123/52 MF, 52 M, 52 MV, 123/52 ML, 65 B, 559, 560

[56] References Cited

U.S. PATENT DOCUMENTS

| 1,938,164 | 12/1933 | Zurmuhle | 123/52 ML |
| 3,935,842 | 2/1976 | Ishizawa et al. | 123/52 MF |
| 4,517,947 | 5/1985 | Nishikawa et al. | 123/52 MF |
| 4,622,926 | 11/1986 | Rutschmann et al. | 123/52 MB |
| 4,682,576 | 7/1987 | Nakamura et al. | 123/52 MF |
| 4,796,584 | 1/1989 | Goto et al. | 123/52 MF |

FOREIGN PATENT DOCUMENTS

| 0019916 | 2/1985 | Japan | 123/52 MF |
| 0088862 | 5/1985 | Japan | 123/52 MB |

*Primary Examiner*—David A. Okonsky
*Attorney, Agent, or Firm*—Harness, Dickey & Pierce

[57] ABSTRACT

In the case of a multicylinder IC engine of the piston type with a stroke charging means (12), and in which branch ducts (16, 18, 20 and 22) extend from at least one air inlet duct (149) to the individual engine cylinders (24, 26, 28 and 30) and at the associated cylinder such ducts are able to be shut by at least one inlet valve (32, 34, 36 and 38), in order to reduce the amount of dead space each branch duct (16, 18, 20 and 22) is provided with a further valve (58, 60, 62 and 64).

8 Claims, 3 Drawing Sheets

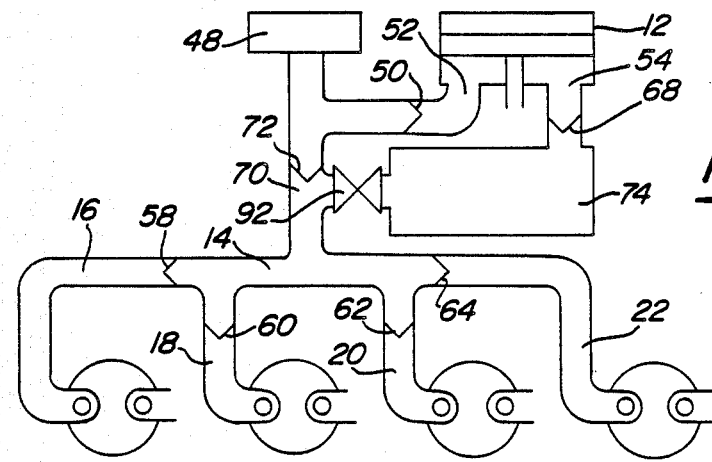
Fig-5
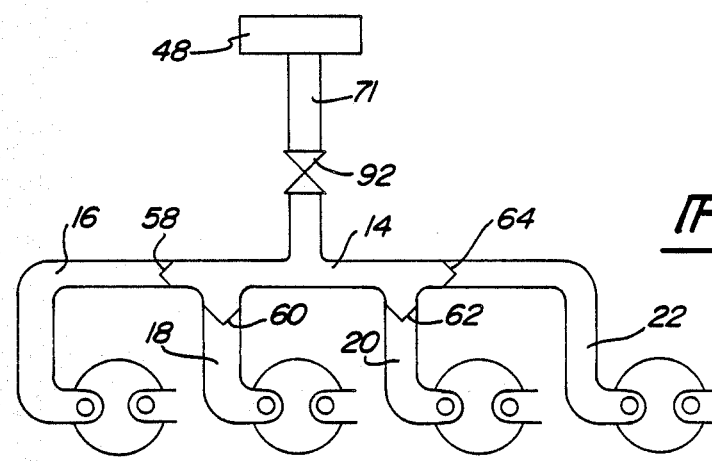
Fig-4
Fig-6

MULTICYLINDER IC ENGINE WITH A STROKE CHARGING DEVICE

The invention relates to a multicylinder IC engine of the piston type with a stroke charging device, in the case of which branch ducts extend from at least one air manifold to the individual engine cylinders, such branch ducts being able to be shut off by at least one inlet valve.

The term stroke charging is used in the sense of a method for the supply of combustion air or of a combustion air fuel mixture into the combustion chamber of a piston engine, in the case of which the charging operation is undertaken with given relationship to the phase of the engine piston during the induction phase discontinuously. One example of this is postcharging in the case of which the engine cylinder to be charged firstly draws in uncompressed combustion air and it is only towards the end of the induction stroke of the engine piston that compressed air is introduced into the cylinder so that the charger only has to compress and expel the differential volume between the desired air requirement and the volume of the engine cylinder to be charged. A special case is direct postcharging, in which the engine cylinder initially draws in combustion air standing under atmospheric pressure without combustion air being simultaneously compressed in the charger. It is only when the engine piston is towards its lower dead center position in the engine cylinder, that is to say shortly prior to the closing of the inlet valve, that a charger, designed in the form of a displacement charger, expels the differential volume directly into the engine cylinder.

The economy in charging work (which is to be performed by the engine and any charger present) aimed at and obtainable with stroke charging, such as postcharging and more especially with direct postcharging, is impaired in the case of multicylinder engines by the unavoidable dead space between the stroke charging device and the engine cylinders. As a result the charge change work is reduced. This dead space consist of the air manifold with its branch ducts leading to the individual engine cylinders and the ducts, opening into the air manifold, for the connection with the stroke charging device and any air induction connection present.

The aim of the invention is to avoid the dead spaces and to achieve an optimum efficiency of the charge change or such change with the least possible effort on the part of the charger to attain the desired charge pressure.

In accordance with the invention this aim is achieved since each branch duct is provided with a further valve.

As a result the branch ducts to the cylinders which are not to be charged are cut off from the flow path between the charger and the engine cylinder which is to be charged. The pressure established in this flow path by the charger remains in the branch duct leading to the inlet valve of the cylinder to be charged after the end of inlet, because the further valve prevents the release of pressure into the air manifold inlet duct during the induction phase of the next cylinder to be charged.

In the case of engines in which the stroke charging device is a piston charger and the charger piston motion is synchronized with the crank shaft motion of the engine, a convenient form of the invention is such that the further valves are check valves.

There is then no longer any need for operating means for these further valves, which respectively open when the charger expels compressed combustion air into the cylinder associated with this valve and which close as soon as the pressure in the air manifold sinks to the pressure obtaining downstream from these valves in the further valves upstream therefrom. The pressure increased by the charger between the closed inlet valve and the further valve arranged in the branch duct remains, when during the induction stroke of another cylinder the pressure in the air manifold decreases. It does therefore not have to be again increased during the recharging of the respective cylinder by the charger and it is therefore also not possible for it to expand into the other cylinder and reduce the proportion of the induced air.

Preferably in this respect the charger has an outlet valve, which may preferably be designed as a flap check valve. As a result more especially in the case of engines with charger induction it is possible to prevent a backflow of combustion air which has already been compressed out of the air manifold system coming after the charger.

In the case of engines in which the output of a charger is connected with a combustion air storage means, which is conncted via an air control valve operated in step with the ignition sequence, it is possible in the manner already described for the further valves to be arranged in a branch from each branch duct from the air manifold and for an air induction duct between the air control valve and the further valves via a check valve to be connected with the air manifold.

In this case the air induction duct may be connected with a further manifold and the latter may be connected via branch ducts containing a respective automatic valve responding to pressure differences, with the individual engine cylinders, an advantageous further development being possible with engines having an air manifold connected at one end with the stroke charging device, such that between the respective sequential branches of branch ducts in the air manifold valves are arranged which may be directional valves in the air manifold.

In accordance with another convenient form of the invention the further valves are arranged at the branch of each branch duct from the air inlet valve.

The term combustion air as used herein is not to be construed in a limiting manner and it is more especially possible to have a combustion air fuel mixture in place of combustion air alone.

The invention will now be described in more detail with reference to the working examples thereof to be seen in the drawing.

FIG. 4 is diagrammatic representation of a four cylinder IC engine with a storage means connected with the output of the charger and from which the charged air flows via a controlled valve.

FIG. 5 shows a first modification of the design in accordance with FIG. 4.

FIG. 6 shows a further possible modification of the design of FIG. 4.

Like or corresponding parts are denoted in the drawings by like reference characters.

Figure 1:
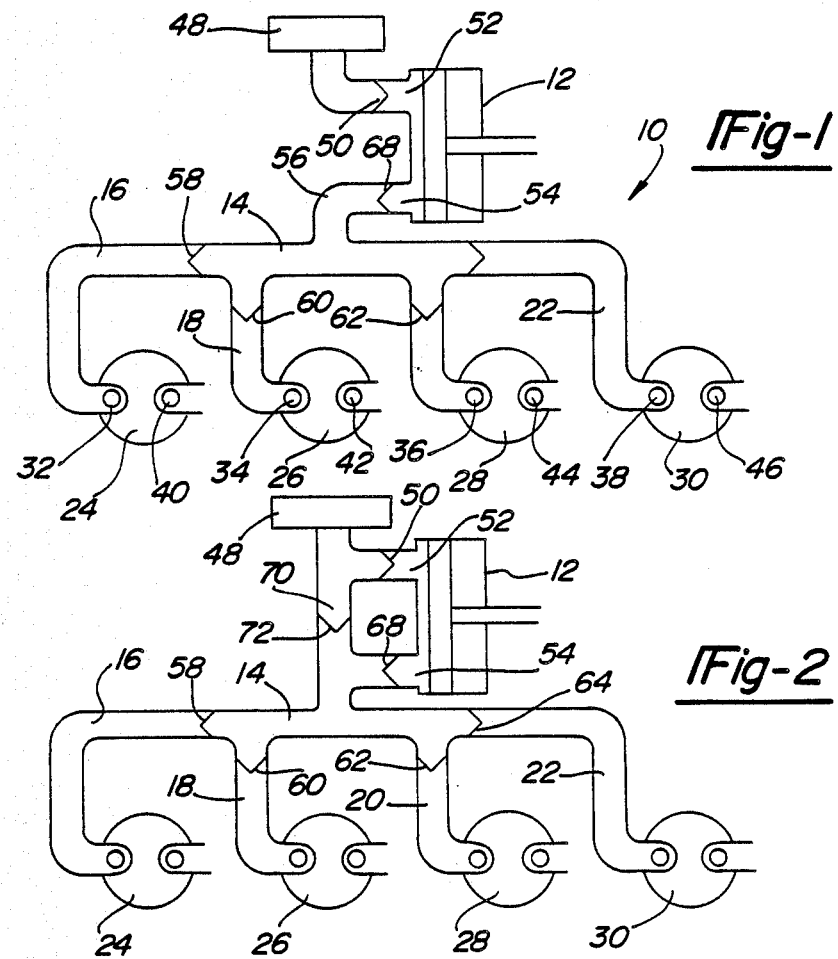
FIG. 1 is a diagrammatic view of a four cylinder IC engine with a piston chargers, used for direct postcharging, with induction by way of the piston charger.

FIG. 1 diagrammatically shows a four cylinder IC engine 10, which is provided with a charger 12 in the form of a piston charger for the supply of compressed combustion air via an air manifold 14. The drive of the charger 12 is so synchronized with the motion of the piston shaft of the engine 10 that the charger 12 compresses and expels the air every time the piston of the engine cylinder to be charged is located at the end of the induction stroke near the lower dead center position so that the terminal charging pressure is raised above atmospheric pressure prior to the end of inlet.

The air manifold 14 is connected via four branch ducts 16, 18, 20 and 22 with the four engine cylinders 24, 26, 28 and 30, such branch ducts 16 through 22 opening respectively via at least one inlet valve 32, 34 and, respectively, 38 in the associated engine cylinders. The outlet valves are diagrammatically indicated and denoted 40, 42, 44 and 46.

In the case of the arrangement shown in FIG. 1, the inlet 52 of the charger is connected via a charger inlet valve 50, designed in the form of a check valve, with an air filter 48. The charger outlet 54 is connected via a duct 56 with the air manifold 14, which serves for the distribution of air among the individual engine cylinders 24 through 30. During the induction stroke of each engine cylinder to be charged the air is supplied via the charger 48 and the charger inlet valve 50 through the charger 12 into the air manifold 14 and via the branch duct 16, 18, 20 or 22, connected with the respective engine cylinder to be charged, to the engine cylinder 24, 26, 28 or 30. When just short of the end of the closure of the respective inlet valve 32, 34, 36 or 38 the piston of the charger 12 performs its pumping stroke and the pressure in the duct system connected with the charger 12 rises, the charger inlet valve 50 closes and the compressed combustion air passes along the path described into the engine cylinder to be charged.

In the arrangement as so far described the air compressed by the charger fills the entire duct system 56, 14, 16, 18, 20 and 22 downstream from the charger 12 as far as the four inlet valves 32, 34, 36 and 38, which forms a relatively large dead space. After the closure of the inlet valve 32, 34, 36 or 38 of the cylinder 24, 26, 28 or 30 which has just been charged, this duct system will still being under the increased pressure caused by the charger 12. When following this the induction phase of the corresponding cylinder begins in accordance with the ignition sequence, the increased pressure in the entire duct system is decreased and has to be increased again in the following postcharging phase in the entire system.

This action is avoid by the check valves 58, 60, 62, and 64, which are located in the branch ducts 16, 18 and, respectively, 22 coming from the air manifold 14. After the end of inlet of the inlet valve 32, 34, 36 or, respectively, 38 separating the respective branch duct form the associated engine cylinder 24, 26, 38 or 30, the increased pressure between the inlet valve 32, 34, 36 or 38 and the check valve 58, 60, 62 or 64 is kept up. During the next postcharging phase it is necessary for the increased pressure only to be built up by the charger 12 in the duct system leading to the respective engine cylinder to be charged, but not however in the branch ducts leading to the other cylinders.

In order to ensure that the charger 12 does not draw in air during its induction stroke from the duct system placed downstream from the charger 12, which it has to pump back again during its pumping stroke, the charger outlet 54 is provided with a check valve 68.

Figure 2:
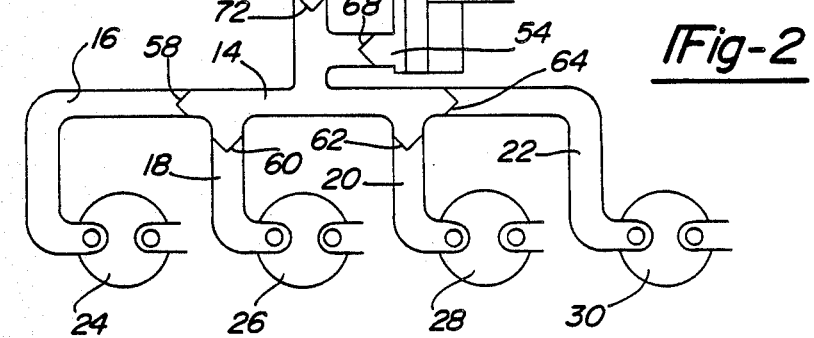
FIG. 2 is a view, similar to that of FIG. 1, showing a four cylinder IC engine but with a separate induction duct.

In the modified design shown in FIG. 2 the manner of operation is again the so-called direct postcharging as in FIG. 1, that is to say the charger 12 expels the compressed combustion air directly before the end of inlet into the engine cylinder to be charged. The induced air is however shunted via a bypass duct 70 between the charger inlet 52 and the charger outlet 54 past the charger 12. In order to ensure that the air compressed by the charger 12 is not able to escape via the bypass duct 70, the latter has a check valve 72 arranged therein upstream from the connection of the charger outlet 54. The charger outlet 54 is also provided with the check valve 68 already noted.

Figure 3:
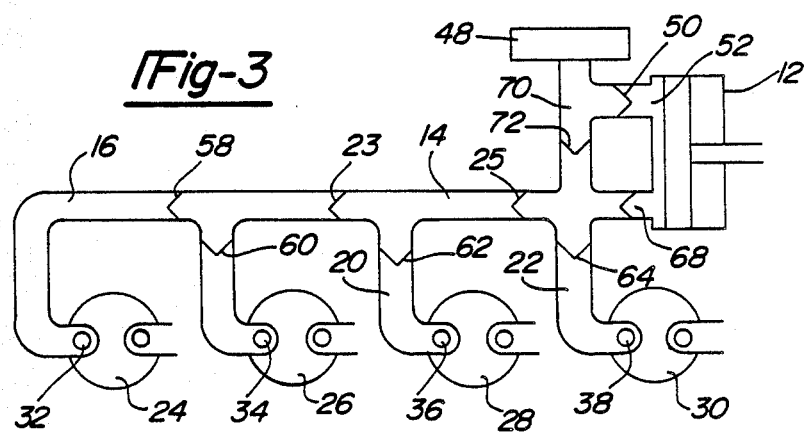
FIG. 3 is a modification of the arrangement of FIG. 2.

The design of FIG. 3 differs from the modification as shown in FIG. 2 inasmuch as the stroke charging device formed by the charger 12 is connected at one end of the air manifold 14, as may be necessary owing to the limited amount of space. In order in this case as well to reduce the amount of dead space as far as possible, there is a check valve 25 in the air manifold 14 between the connections of the branch ducts 20 and 22 and between the connections of the branch ducts 18 and 20 there is a check valve 23 so that during charging of the cylinder 30 the part, which is downstream from the check valve 25, of the air manifold system of the cylinders 24 to 28 is not affected, while during charging of the cylinder 28 the branch ducts 16 and 18 with the part, placed downstream from the check valve 23, of the air manifold 14 and the branch duct 22 are not affected.

FIG. 4 shows an arrangement, in which the charger 12 pumps into a pressure storage means 74 from which the compressed combustion air is let off during the postcharging phase respectively via valve 92 operated in accordance with the rotating of the engine crank shaft. In the case of this arrangement it is possible to use other types of charger so as to depart from the piston charger 12 shown. The bypass duct 70 opens via the check valve 72 into the air manifold 14 so that the arrangement is largely like that of FIG. 2. FIG. 5 on the other hand shows a modification without the a duct bypassing the storage means 74 so that the cylinders 23 through 30 are only charged from the storage means 74. Another modification for aspiration operation only is shown in FIG. 6, in the case of which the charger 12 with the storage means 74 are omitted and the air control valve 92 is placed in the induction duct between the air filter 48 and the air manifold 14. As a result it is possible when running under partial load for a gasoline or diesel engine to be changed over from air quantity regulation to pre-expansion by a choking effect without a large expense being required for individual stroke valves for each manifold cylinder.

Figure 7:
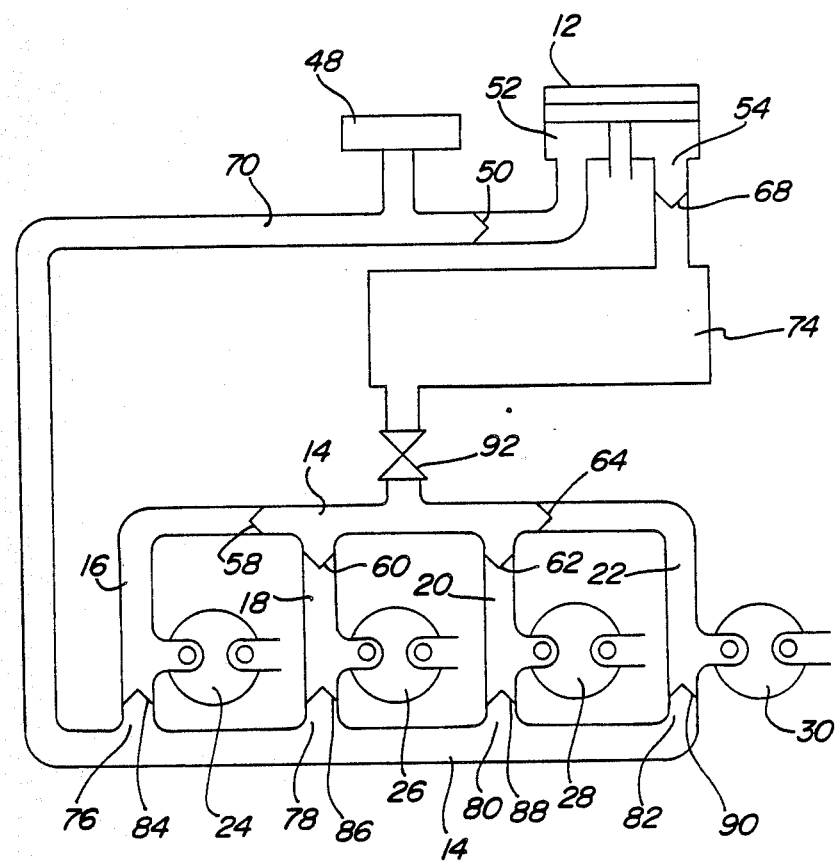
FIG. 7 shows yet a further modification of the device of FIG. 4.

In the modification shown in FIG. 7 of the arrangement with one air control valve 92 the bypass duct 70 is connected with a further air manifold 14', which supplies the individual cylinder 24 through 30 via branch ducts 76, 78, 80 and 82, which are respectively provided with a check valve 84, 86, 88 and, respectively, 90. This makes it possible for the induced air to flow through only one single check valve so that there are lower choking losses.

I claim:

1. A multicylinder IC engine of the piston type with a stroke charging device (12; 12, 74, 92; 92), in the case of which branch ducts (16, 18, 20, 22; 76, 78, 80 and 82) extend from at least an air manifold (14 and 14') to the individual engine cylinders (24, 26, 28 and 30) and are able to be shut off at the respective cylinder (24, 26, 28 and 30) by at least one inlet valve (32, 34, 36 and 38) characterized in that each branch (16, 18, 20, 22; 76, 78, 80 and 82) is provided with a further valve (58, 60, 62, 64; 84, 86, 88 and 90) and additional valve means arranged in said air manifold between the respective sequential branches of branch ducts.

2. The multicylinder IC engine as claimed in claim 1, in the case of which the stroke charging device (12) is a piston charger and the charger position motion is synchronized with the crank shaft motion of the engine, characterized in that the further valves (58, 60, 62 and 64) and check valves.

3. The multicylinder IC engine as claimed in claim 2, characterized in that the charger (12) has an outlet valve (68).

4. The multicylinder IC engine as claimed in claim 3, characterized in that the outlet valve (68) on the charger (12) is a check valve.

5. The multicylinder IC engine as claimed in claim 1, in the case of which the output (54) of a charger (12) is connected with a combustion air storage means (74), which is connected with an air manifold (14) via an air valve (92) operated in accordance with the ignition sequence, characterized in that the further valves (58, 60, 62 and 64) are arranged in a branch of each branch duct (16, 18, 20 and 229) from the air manifold (14) and in that an air induction duct (70) between the air control valve (92) and the further valves (58, 60, 62 and 64) via check valve (72) is connected with the air manifold (14).

6. The multicylinder IC engine as claimed in claim 5, characterized in that the air induction duct (70) is connected with a further air manifold (14') and the later is connected via branch ducts (76, 78, 80 and 82) comprising respectively an automatic valve (84, 86, 88 and 90) responding to pressure differences with the individual engine cylinders (24, 26, 28 and 40).

7. The multicylinder IC engine as claimed in claim 1, characterized in that the valves (25 and 23) in the air manifold (14) are directional valves.

8. The multicylinder IC engine as claimed in claim 1 characterized in that the further valves (58, 60, 62 and 64) are arranged in the branch of each branch duct (16, 18, 20 and 22) from the air inlet duct (14).

* * * * *

UNITED STATES PATENT AND TRADEMARK OFFICE
CERTIFICATE OF CORRECTION

PATENT NO. : 4,928,639

DATED : May 29, 1990

INVENTOR(S) : Oskar Schatz

It is certified that error appears in the above-identified patent and that said Letters Patent is hereby corrected as shown below:

Col. 1, Line 41, "consist" should be --consists--;

Col. 2, Line 52, "drawing" should be --drawings--;

Col. 2, Line 54, "chargers" should be --charger--;

Col. 3, Line 49, "being" should be --be--;

Col. 3, Line 56, "avoid" should be --avoided--;

Col. 3, Line 61, "form" should be --from--;

Col. 3, Line 61, "38" should be --28--;

Col. 4, Line 46, delete "the" after --without--;

Col. 5, Line 19, "and" should be --are--;

Col. 6, Line 8, "229" should be --22--;

UNITED STATES PATENT AND TRADEMARK OFFICE
CERTIFICATE OF CORRECTION

PATENT NO. : 4,928,639

DATED : May 29, 1990

INVENTOR(S) : Oskar Schatz

It is certified that error appears in the above-identified patent and that said Letters Patent is hereby corrected as shown below:

Column 6, Line 18, "40" should be --30--.

Signed and Sealed this

Thirty-first Day of March, 1992

Attest:

HARRY F. MANBECK, JR.

*Attesting Officer*     *Commissioner of Patents and Trademarks*